US011628512B2

(12) United States Patent
Sakai et al.

(10) Patent No.: US 11,628,512 B2
(45) Date of Patent: Apr. 18, 2023

(54) CLAD STEEL PLATE AND METHOD OF PRODUCING THE SAME

(71) Applicant: JFE STEEL CORPORATION, Tokyo (JP)

(72) Inventors: Ryosuke Sakai, Tokyo (JP); Yota Kuronuma, Tokyo (JP); Junji Shimamura, Tokyo (JP); Tomoyuki Yokota, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 119 days.

(21) Appl. No.: 17/254,855

(22) PCT Filed: Jun. 25, 2019

(86) PCT No.: PCT/JP2019/025218
§ 371 (c)(1),
(2) Date: Dec. 22, 2020

(87) PCT Pub. No.: WO2020/004410
PCT Pub. Date: Jan. 2, 2020

(65) Prior Publication Data
US 2021/0260689 A1    Aug. 26, 2021

(30) Foreign Application Priority Data

Jun. 27, 2018   (JP) .............................. JP2018-122350

(51) Int. Cl.
| | |
|---|---|
| *C22C 38/00* | (2006.01) |
| *B23K 20/04* | (2006.01) |
| *C21D 8/02* | (2006.01) |
| *C22C 19/03* | (2006.01) |
| *C22C 38/42* | (2006.01) |
| *C22C 38/44* | (2006.01) |
| *C22C 38/46* | (2006.01) |
| *C22C 38/58* | (2006.01) |
| *B23K 103/18* | (2006.01) |
| *B23K 103/04* | (2006.01) |
| *B23K 103/08* | (2006.01) |

(52) U.S. Cl.
CPC .............. *B23K 20/04* (2013.01); *C21D 8/02* (2013.01); *C22C 19/03* (2013.01); *C22C 38/002* (2013.01); *C22C 38/42* (2013.01); *C22C 38/44* (2013.01); *C22C 38/46* (2013.01); *C22C 38/58* (2013.01); *B23K 2103/04* (2018.08); *B23K 2103/08* (2018.08); *B23K 2103/18* (2018.08); *C21D 2211/001* (2013.01); *C21D 2211/002* (2013.01); *C21D 2251/02* (2013.01)

(58) Field of Classification Search
None
See application file for complete search history.

(56) References Cited

U.S. PATENT DOCUMENTS

| | | | |
|---|---|---|---|
| 10,640,841 B2 | 5/2020 | Kimura et al. | |
| 2011/0008647 A1 | 1/2011 | Azuma et al. | |
| 2013/0000793 A1* | 1/2013 | Ishikawa ................. | C22C 38/06 |
| | | | 148/333 |
| 2015/0159246 A1 | 6/2015 | Kishi et al. | |
| 2015/0176727 A1* | 6/2015 | Tanizawa ............. | C21D 9/0081 |
| | | | 148/333 |
| 2018/0340238 A1* | 11/2018 | Kimura ................... | C22C 38/38 |

FOREIGN PATENT DOCUMENTS

| | | |
|---|---|---|
| CN | 104321455 A | 1/2015 |
| EP | 3604597 A1 | 2/2020 |
| EP | 3219820 B1 | 8/2020 |
| JP | H05154672 A | 6/1993 |
| JP | 2012241271 A | 12/2012 |
| JP | 2015086422 A | 5/2015 |
| JP | 2015105399 A | 6/2015 |
| JP | 2015117408 A | 6/2015 |
| JP | 2015224376 A | 12/2015 |
| JP | 2016108665 A | 6/2016 |
| WO | 2016075925 A1 | 5/2016 |
| WO | WO-2016075925 A1 * | 5/2016 ............. B23K 20/04 |
| WO | 2016157863 A1 | 10/2016 |
| WO | 2018181381 A1 | 10/2018 |

OTHER PUBLICATIONS

Oct. 1, 2019, International Search Report issued in the International Patent Application No. PCT/JP2019/025218.
Jun. 29, 2021, the Extended European Search Report issued by the European Patent Office in the corresponding European Patent Application No. 19824522.7.
Aug. 13, 2021, Office Action issued by the China National Intellectual Property Administration in the corresponding Chinese Patent Application No. 201980040858.1 with English language search report.

* cited by examiner

*Primary Examiner* — Seth Dumbris
*Assistant Examiner* — Kim S. Horger
(74) *Attorney, Agent, or Firm* — Kenja IP Law PC

(57) ABSTRACT

Disclosed is a clad steel plate with further improved low temperature toughness along with excellent HIC resistance while ensuring a tensile strength of 535 MPa or more. A clad steel plate includes: a base steel; and a clad metal made of a corrosion resistant alloy bonded to one surface of the base steel, in which the base steel has: a chemical composition with appropriately controlled values of ACR and $P_{HIC}$; and a steel microstructure in which bainite is present in an area fraction of 94% or more at a ½ thickness position in a thickness direction of the base steel, and with an average crystal grain size of 25 μm or less, and shear strength at a bonded interface between the base steel and the cladding metal is 300 MPa or more.

6 Claims, No Drawings

CLAD STEEL PLATE AND METHOD OF PRODUCING THE SAME

TECHNICAL FIELD

This disclosure relates to a clad steel plate and a method of producing the same, and more particularly to a clad steel plate suitable for line pipes and a method of producing the same.

BACKGROUND

Clad steel plates are steel plates formed by bonding base steel such as carbon steel to a cladding metal made of a corrosion resistant alloy. Such a clad steel plate has an advantage of being economically efficient because it can ensure corrosion resistance as high as that of a solid metal while reducing the amount of expensive alloying elements used.

In recent years, oil and natural gas development has expanded to areas exposed to a severe corrosion environment. It is expected that demand for line pipes, which enables economical transportation of oil and natural gas, will grow accordingly. Clad steel plates, in particular, nickel base alloy clad steel plates and austenitic stainless clad steel plates are expected to be applied to line pipes exposed to a severe corrosion environment because of their high corrosion resistance.

Clad steel plates for line pipes are required to ensure certain mechanical properties, in particular excellent low temperature toughness from the viewpoint of preventing brittle fracture of pipelines, in addition to the corrosion resistance of the cladding metal.

As one of such clad steel plates, for example, JP2015-86422A (PTL 1) describes "a Ni-alloy clad steel plate comprising: a low-alloy steel as a base steel excellent in low temperature toughness and HAZ toughness; and a Ni alloy as a cladding metal excellent in corrosion resistance, wherein the base steel has a chemical composition containing, in mass %, C: 0.020% to 0.100%, Si: 0.10% to 0.50%, Mn: 0.75% to 1.80%, P: 0.015% or less, S: 0.0030% or less, Cu: 0.01% to 0.50%, Ni: 0.01% to 0.45%, Cr: 0.01% to 0.50%, Mo: 0.01% to 0.50%, Nb: 0.005% to 0.080%, Ti: 0.005% to 0.030%, N: 0.0010% to 0.0060%, Al: 0.070% or less, Ca: 0.0010% to 0.0040%, with the balance being Fe and inevitable impurities".

In addition, JP2015-117408A (PTL 2) describes "a Ni-alloy clad steel plate comprising: a low-alloy steel as a base steel excellent in low temperature toughness and HAZ toughness; and a Ni alloy as a cladding metal excellent in corrosion resistance, wherein the base steel has a chemical composition containing, in mass %, C: 0.020% to 0.100%, Si: 0.10% to 0.50%, Mn: 0.75% to 1.80%, P: 0.015% or less, S: 0.0030% or less, Cu: 0.01% to 0.50%, Ni: 0.01% to 0.45%, Cr: 0.01% to 0.50%, Mo: 0.01% to 0.50%, Nb: 0.005% to 0.080%, Ti: 0.005% to 0.030%, N: 0.0010% to 0.0060%, Al: 0.070% or less, Ca: 0.0010% to 0.0040%, with the balance being Fe and inevitable impurities".

Further, JP2015-105399A (PTL 3) describes "an austenitic stainless clad steel plate comprising: a low-alloy steel as a base steel excellent in low temperature toughness and HAZ toughness; and an austenitic stainless steel as a cladding metal excellent in corrosion resistance, wherein the base steel has a chemical composition containing, in mass %, C: 0.020% to 0.100%, Si: 0.10% to 0.50%, Mn: 0.75% to 1.80%, P: 0.015% or less, S: 0.0030% or less, Cu: 0.01% to 0.50%, Ni: 0.01% to 0.45%, Cr: 0.01% to 0.50%, Mo: 0.01% to 0.50%, Nb: 0.005% to 0.080%, Ti: 0.005% to 0.030%, N: 0.0010% to 0.0060%, Al: 0.070% or less, and Ca: 0.0010% to 0.0040%, with the balance being Fe and inevitable impurities".

CITATION LIST

Patent Literature

PTL 1: JP2015-86422A
PTL 2: JP2015-117408A
PTL 3: JP2015-105399A

SUMMARY

Technical Problem

In the techniques disclosed in PTLs 1 to 3, TMCP (thermo-mechanical control process) is used to provide proper mechanical properties such that the plate thickness is 30 mm or less, the tensile strength is 535 MPa or more, and $DWTTSA_{-20°\ C.}$ is 85% or more, together with a proper corrosion resistance of the cladding metal, without impairing the productivity.

Here, $DWTTSA_{-20°\ C.}$ is a percent shear area obtained by DWTT test in accordance with API-5L (test temperature: −20° C.).

However, since a clad steel plate undergoes strain hardening during pipe forming, considering the degradation in toughness due to the strain hardening, further improvement of low temperature toughness is required at present.

In recent years, against the background of pipeline leakage accidents in a wet hydrogen sulfide environment, there has been a trend toward safer designs. Accordingly, clad steel plates for line pipes are currently required to have base steel with an improved hydrogen-induced cracking property (hereinafter referred to as hydrogen-induced cracking (HIC) resistance).

In view of the above circumstances, it would thus be helpful to provide a clad steel plate with further improved low temperature toughness along with excellent HIC resistance while ensuring a tensile strength of 535 MPa or more, and an advantageous method of producing the same.

As used herein, "excellent low temperature toughness" and other similar expressions mean that a percent shear area obtained by DWTT test in accordance with API-5L (test temperature: −30° C.), expressed as $DWTTSA_{-30°\ C.}$, is 85% or more. In the DWTT test, the test temperature was set at −30° C. in anticipation of a decrease in toughness due to strain hardening during pipe forming.

In addition, "excellent HIC resistance" and other similar expressions mean that a crack area ratio (CAR) obtained by HIC test in accordance with NACE Standard TM0284-2003 is 5.0% or less.

Solution to Problem

The present inventors made intensive studies to develop a clad steel plate with improved low temperature toughness, along with improved HIC resistance of the base steel, while ensuring certain mechanical properties, and obtained the following findings.

(A) In order to obtain excellent low temperature toughness, it is useful to achieve both refining of microstructures that would increase the resistance to brittle crack propagation in base steel and reduction of hard phase that would provide an origin of a brittle crack (a fracture origin).

Specifically, it is effective to provide the base steel with a steel microstructure mainly composed of bainite, i.e., a steel microstructure in which bainite is present in an area fraction of 94% or more at a ½ thickness position in a thickness direction of the base steel, and with an average crystal grain size of 25 μm or less.

(B) For this microstructural control, it is important to properly control the chemical composition and the production conditions, in particular quenching and tempering conditions after rolling.

However, in terms of improving the low temperature toughness by microstructure refinement, lower finish rolling temperatures are more advantageous, while higher finish rolling temperatures are more advantageous in terms of improving the HIC resistance.

In order to achieve a balance between low temperature toughness and HIC resistance, the present inventors made further investigations.

As a result, it was revealed that excellent low temperature toughness and HIC resistance can be obtained at the same time while ensuring certain mechanical properties by:

setting the finish rolling temperature at or above Ara temperature; and reducing the S content as much as possible, and adding Ca in an appropriate amount depending on the S content and the O content in the steel such that S is immobilized in the steel so as to suppress the formation of MnS, and at the same time, adjusting the contents such as the C content, the Mn content, and the P content appropriately to suppress the hardness increase at the center segregation of the base steel, more specifically, by having a chemical composition satisfying both of the formulas (1) and (2) given below:

$$1.00 \leq ACR \leq 6.00 \quad (1),$$

where ACR is defined by:

$$ACR=([Ca]-(0.18+130[Ca])\times[O])/(1.25[S]),$$

where [Ca], [O], and [S] respectively represent the contents in mass % of Ca, O, and S in the base steel, and $$P_{HIC} < 1.000 \quad (2),$$

where $P_{HIC}$ is defined by:

$$P_{HIC}=4.46[C]+2.37[Mn]/6+(1.18[Cr]+1.95[Mo]+1.74[V])/5+(1.74[Cu]+1.7[Ni])/15+22.36[P],$$

where [C], [Mn], [Cu], [Ni], [Cr], [Mo], [V], and [P] respectively represent the contents in mass % of C, Mn, Cu, Ni, Cr, Mo, V, and P in the base steel.

The present disclosure was completed based on the above discoveries and further investigations.

Primary features of the present disclosure are as follows.

1. A clad steel plate comprising: a base steel; and a cladding metal made of a corrosion resistant alloy bonded to one surface of the base steel; wherein the base steel has a chemical composition containing (consisting of), in mass %, C: 0.020% or more and 0.100% or less, Si: 0.05% or more and 0.50% or less, Mn: 0.75% or more and 1.60% or less, P: 0.010% or less, S: 0.0010% or less, Al: 0.010% or more and 0.070% or less, Nb: 0.005% or more and 0.080% or less, Ti: 0.005% or more 0.030% or less, N: 0.0010% or more and 0.0060% or less, Ca: 0.0005% or more and 0.0040% or less, O: 0.0030% or less, and at least one selected from the group consisting of Cu: 0.01% or more and 0.50% or less, Cr: 0.01% or more and 0.50% or less, Mo: 0.01% or more and 0.50% or less, V: 0.010% or more and 0.100% or less, and Ni: 0.01% or more and 0.50% or less, so as to satisfy relations given by the following formulas (1) and (2), with the balance being Fe and inevitable impurities:

$$1.00 \leq ACR \leq 6.00 \quad (1),$$

where ACR is defined by:

$$ACR=([Ca]-(0.18+130[Ca])\times[O])/(1.25[S]),$$

where [Ca], [O], and [S] respectively represent the contents in mass % of Ca, O, and S in the base steel, and $$P_{HIC} < 1.000 \quad (2),$$

where $P_{HIC}$ is defined by:

$$P_{HIC}=4.46[C]+2.37[Mn]/6+(1.18[Cr]+1.95[Mo]+1.74[V])/5+(1.74[Cu]+1.7[Ni])/15+22.36[P],$$

where [C], [Mn], [Cr], [Mo], [V], [Cu], [Ni], and [P] respectively represent the contents in mass % of C, Mn, Cr, Mo, V, Cu, Ni, and P in the base steel, wherein the base steel has a steel microstructure in which bainite is present in an area fraction of 94% or more at a ½ thickness position in a thickness direction of the base steel, and with an average crystal grain size of 25 μm or less, and wherein shear strength at a bonded interface between the base steel and the cladding metal is 300 MPa or more.

2. The clad steel plate according to 1., wherein the corrosion resistant alloy is a nickel base alloy or an austenitic stainless steel.

3. A method of producing a clad steel plate, comprising: preparing a slab by stacking a base steel raw material having the chemical composition of the base steel as recited in 1. and a cladding metal raw material made of a corrosion resistant alloy, and heating the slab to a temperature range of 1050° C. to 1200° C. in surface temperature; subjecting the slab to first rolling with a rolling reduction ratio at a temperature range of 950° C. or higher in surface temperature being 2.0 or more, followed by second rolling with an accumulated rolling reduction ratio at a temperature range of 900° C. or lower in surface temperature being 50% or more and a finish rolling temperature being at or above $Ar_3$ temperature in surface temperature, to thereby obtain a rolled plate formed of a base steel and a cladding metal; then subjecting the rolled plate to accelerated cooling with a cooling start temperature being at or above the $Ar_3$ temperature in surface temperature, an average cooling rate being 5° C./s or higher, and a cooling stop temperature being 500° C. or lower at a ½ thickness position in a thickness direction of the base steel; and then subjecting the rolled plate to tempering in a temperature range of 350° C. to 600° C. at the ½ thickness position in the thickness direction of the base steel.

In the accelerated cooling, the average cooling rate is obtained by dividing the difference between the cooling start temperature and the cooling stop temperature at the ½ thickness position in the thickness direction of the base steel by a cooling time.

4. A method of producing a clad steel plate, comprising: preparing a slab by stacking a base steel raw material having the chemical composition of the base steel as recited in 1. and a cladding metal raw material made of either austenitic stainless steel or a nickel base alloy of Alloy 825, and then heating the slab to a temperature range of 1050° C. to 1200° C. in surface temperature; subjecting the slab to first rolling with a rolling reduction ratio being 1.5 or more in a temperature range of 950° C. or higher in surface temperature, followed by second rolling with an accumulated rolling reduction ratio being 50% or more in a temperature range of 900° C. or lower in surface temperature and a finish rolling temperature being at or above Ar₃ temperature in surface temperature, to thereby obtain a rolled plate formed of a base steel and a cladding metal; then subjecting the rolled plate to accelerated cooling with a cooling start temperature being at or above Ar₃ temperature in surface temperature, an average cooling rate being 5° C./s or higher, and a cooling stop temperature being 500° C. or lower at a ½ thickness position in a thickness direction of the base steel; and then subjecting the rolled plate to tempering in a temperature range of 350° C. to 600° C. at the ½ thickness position in the thickness direction of the base steel.

In the accelerated cooling, the average cooling rate is obtained by dividing the difference between the cooling start temperature and the cooling stop temperature at the ½ thickness position in the thickness direction of the base steel by a cooling time.

5. The method of producing a clad steel plate according to 3. or 4., wherein the slab is prepared by stacking the base steel raw material and the cladding metal raw material in the following order: the base steel raw material/the cladding metal raw material/the cladding metal raw material/the base steel raw material.

Advantageous Effect

According to the present disclosure, it is possible to obtain a clad steel plate that has DWTTSA$_{-30°\ C.}$ of 85% or more and that has excellent HIC resistance in the base steel, while ensuring a tensile strength of 535 MPa or more.

The clad steel plate disclosed herein is also extremely beneficial to industry as it can be applied to line pipes for oil and natural gas transportation, which are exposed to a severe corrosion environment.

DETAILED DESCRIPTION

The present disclosure will be described in detail below.

The present disclosure is directed to a clad steel plate in which a cladding metal made of a corrosion resistant alloy is bonded to one surface of a base steel. Note that the plate thickness of the clad steel plate is not particularly limited, yet is preferably 30 mm or less. In addition, the thickness of the base steel is preferably 5 mm or more and 27 mm or less, and the thickness of the cladding metal is preferably 1.5 mm or more and 4.0 mm or less.

First, the chemical composition of the base steel of the clad steel plate disclosed herein will be described. The % representations below indicating the chemical composition are in mass % unless stated otherwise.

1. Chemical Composition of the Base Steel

C: 0.020% or More and 0.100% or Less

C is an element that contributes to precipitation strengthening in the form of a carbide. When the C content is less than 0.020%, sufficient strength cannot be obtained. On the other hand, when the C content exceeds 0.100%, not only the toughness in the base steel and the heat affected zone (HAZ) but also the HIC resistance deteriorate. Therefore, the C content is 0.020% or more and 0.100% or less. It is preferably 0.080% or less.

Si: 0.05% or More and 0.50% or Less

Si is an element to be added for deoxidizing and for ensuring the strength of the steel material through solid solution strengthening. When the Si content is less than 0.05%, this effect is not sufficient. On the other hand, when the Si content exceeds 0.50%, the toughness and weldability deteriorate. Therefore, the Si content is 0.05% or more and 0.50% or less. It is preferably 0.10% or more and more preferably 0.20% or more. It is preferably 0.40% or less.

Mn: 0.75% or More and 1.60% or Less

Mn is an element to be added to ensure strength and toughness. When the Mn content is less than 0.75%, this effect is not sufficient. On the other hand, when the Mn content exceeds 1.60%, the weldability and HIC resistance deteriorate. Therefore, the Mn content is 0.75% or more and 1.60% or less. It is preferably 1.00% or more. It is preferably 1.40% or less.

P: 0.010% or Less

P is an impurity element that causes an increase in hardness at the center segregation and a degradation in HIC resistance. Therefore, the P content is 0.010% or less. It is preferably 0.006% or less. Note that the lower limit of the P content is not particularly limited, and may be 0%.

S: 0.0010% or less

S is generally present in the form of a sulfide inclusion in steel, and causes a degradation in toughness and HIC resistance. Therefore, a lower S content is preferred, and the S content is 0.0010% or less. It is preferably 0.0008% or less. Note that the lower limit of the S content is not particularly limited, and may be 0%.

Al: 0.010% or More and 0.070% or Less

Al is an element to be added for the deoxidizing purpose. When the Al content is less than 0.010%, this effect is not sufficient. On the other hand, when the Al content exceeds 0.070%, an alumina cluster forms, causing a degradation in ductility. Therefore, the Al content is 0.010% or more and 0.070% or less. It is preferably 0.040% or less.

Nb: 0.005% or More and 0.080% or Less

Nb is an element effective for increasing the strength of the steel plate by increasing hardenability, through precipitation strengthening, and so on. It is also effective for broadening the γ non-crystallization temperature range and contributes to improving toughness through microstructure refining. However, when the Nb content is less than 0.005%, this effect is not sufficient. On the other hand, when the Nb content exceeds 0.080%, martensite-austenite constituent (MA) and/or coarse Nb carbonitrides form, causing the toughness in the heat affected zone and the HIC resistance to deteriorate. Therefore, the Nb content is 0.005% or more and 0.080% or less. It is preferably 0.010% or more. It is preferably 0.060% or less.

Ti: 0.005% or More and 0.030% or Less

When Ti is contained in an amount of 0.005% or more, Ti forms of a nitride which suppresses coarsening of austenite by the pinning effect, and contributes to ensuring the toughness in the base steel and the heat affected zone. Ti is also effective for increasing the strength of the steel plate through precipitation strengthening. However, when the Ti content exceeds 0.030%, a coarse nitride forms, providing an origin of brittle fracture or ductile fracture (a fracture origin). Therefore, the Ti content is 0.005% or more and 0.030% or less. It is preferably 0.020% or less.

N: 0.0010% or More and 0.0060% or Less

When N is contained in an amount of 0.0010% or more, N forms a nitride which suppresses coarsening of austenite through the pinning effect, and contributes to ensuring the toughness in the base steel and the heat affected zone. However, when the N content exceeds 0.0060%, the toughness in the heat affected zone deteriorate. Therefore, the N content is 0.0010% or more and 0.0060% or less. It is preferably 0.0020% or more. It is preferably 0.0050% or less.

In order to sufficiently exhibit the pinning effect of nitride formation, it is also important to adjust the ratio between the Ti content and N content. Specifically, when the ratio of the Ti content to the N content (Ti content/N content) in mass % is smaller than 2.0 or greater than 3.5, the pinning effect of nitride formation is not sufficiently demonstrated, which may cause coarsening of austenite and a degradation in toughness. Therefore, the ratio of Ti content/N content is preferably 2.0 or more and 3.5 or less.

Ca: 0.0005% or More and 0.0040% or Less

Ca acts to immobilize S in the steel, improving the toughness and HIC resistance of the steel plate. To obtain this effect, Ca is contained in an amount of 0.0005% or more. However, when the Ca content exceeds 0.0040%, inclusions in the steel increase, which may end up deteriorating the toughness and HIC resistance. Therefore, the Ca content is 0.0005% or more and 0.0040% or less. It is preferably 0.0010% or more and more preferably 0.0020% or more. It is preferably 0.0030% or less.

O: 0.0030% or Less

O is generally present in the form of an oxide of Al, Ca, and so on in steel. An excessively high O content increases oxides in the steel, leading to a degradation in toughness and HIC resistance. Therefore, the O content is 0.0030% or less. It is preferably 0.0020% or less. Note that the lower limit of the O content is not particularly limited, and may be 0%.

At least one selected from Cu: 0.01% or more and 0.50% or less, Cr: 0.01% or more and 0.50% or less, Mo: 0.01% or more and 0.50% or less, V: 0.010% or more and 0.100% or less, and Ni: 0.01% or more and 0.50% or less Cu, Cr, Mo, and Ni are elements for improving hardenability that contribute to increasing the strength of the base steel and the heat affected zone. V also contributes to increasing the strength of the steel plate through precipitation strengthening. To obtain these effects, at least one of these elements is contained in the following amount: when Cu, Cr, Mo, and/or Ni is added, the content of each added element is 0.01% or more, and when V is added, the V content is 0.010% or more. In addition, when Cu, Cr, Mo, and/or Ni is added, the content of each added element is preferably 0.05% or more.

On the other hand, when Cu, Cr, and/or Mo is added and the content of each added element exceeds 0.50%, the toughness in the heat affected zone may deteriorate. Therefore, when Cu, Cr, and/or Mo is added, the content of each added element is 0.50% or less. It is preferably 0.40% or less.

Similarly, when V is added and its content exceeds 0.100%, the toughness in the heat affected zone may deteriorate. Therefore, when V is added, the V content is 0.100% or less.

Further, since Ni is an expensive element, adding a large amount of N leads to an increase in cost. Therefore, when Ni is added, the Ni content is 0.50% or less. It is preferably 0.40% or less.

Although the basic components have been described, it is also important to properly control the values of ACR and $P_{HIC}$ as given in the following formulas (1) and (2):

$$1.00 \le ACR \le 6.00 \quad (1),$$

where ACR is defined by:

$$ACR=([Ca]-(0.18+130[Ca])\times[O])/(1.25[S]),$$

where [Ca], [O], and [S] respectively represent the contents in mass % of Ca, O, and S in the base steel, and $$P_{HIC}<1.000 \quad (2),$$

where $P_{HIC}$ is defined by:

$$P_{HIC}=4.46[C]+2.37[Mn]/6+(1.18[Cr]+1.95[Mo]+1.74[V])/5+(1.74[Cu]+1.7[Ni])/15+22.36[P],$$

where [C], [Mn], [Cr], [Mo], [V], [Cu], [Ni], and [P] respectively represent the contents in mass % of C, Mn, Cr, Mo, V, Cu, Ni, and P in the base steel.

The content of any element not contained in the base steel has a value of "0" when determining ACR and $P_{HIC}$.

For example, if none of Cr, Mo, V, Cu, and Ni is contained, $P_{HIC}$ may be determined as:

$$P_{HIC}=4.46[C]+2.37[Mn]/6+22.36[P].$$

$1.00 \le ACR \le 6.00$

ACR is a numerical value taken as an index of the effectiveness of Ca for suppressing the formation of MnS. Specifically, since MnS in the steel affects hydrogen-induced cracking, in order to improve HIC resistance, it is effective to immobilize S in the steel by Ca to suppress the formation of MnS. In this respect, when the value of ACR is less than 1.00, such MnS formation suppressing effect is not sufficient. On the other hand, when the value of ACR exceeds 6.00, although the formation of MnS is suppressed, a large amount of Ca-based oxide is generated, which ends up deteriorating the HIC resistance. Therefore, the following relation should hold: $1.00 \le ACR \le 6.00$. The value of ACR is preferably 1.40 or more. It is preferably 3.30 or less.

$P_{HIC}<1.000$ $P_{HIC}$ is a numeric value taken as an index of the hardness at the center segregation; a larger value indicates a higher hardness at the center segregation. Since the hardness at the center segregation affects hydrogen-induced cracking, in order to improve HIC resistance, it is effective to suppress an increase in hardness at the center segregation. Therefore, the value of $P_{HIC}$ is less than 1.000. It is preferably 0.900 or less. The lower limit is not particularly limited, yet is preferably 0.750 or more.

Components other than the above are Fe and inevitable impurities.

That is, the base steel may have a chemical composition containing, in mass %, C: 0.020% or more and 0.100% or less, Si: 0.05% or more and 0.50% or less, Mn: 0.75% or more and 1.60% or less, P: 0.010% or less, S: 0.0010% or less, Al: 0.010% or more and 0.070% or less, Nb: 0.005% or more and 0.080% or less, Ti: 0.005% or more and 0.030% or less, N: 0.0010% or more and 0.0060% or less, Ca: 0.0005% or more and 0.0040% or less, and O: 0.0030% or less, and at least one selected from the group consisting of Cu: 0.01% or more and 0.50% or less, Cr: 0.01% or more and 0.50% or less, Mo: 0.01% or more and 0.50% or less, V: 0.010% or more and 0.100% or less, and Ni: 0.01% or more and 0.50% or less, so as to satisfy the relations given by the formulas (1) and (2) above, with the balance being Fe and inevitable impurities.

2. Steel Microstructure of the Base Steel

Area fraction of bainite at a ½ thickness position in the thickness direction of the base steel: 94% or more Bainite is a key microstructure for both strength and low temperature toughness. In addition, bainite effectively contributes to improving the strength of the steel plate through transformation strengthening. Therefore, the base steel should have a steel microstructure mainly composed of bainite, specifically, a steel microstructure in which bainite should be present in an area fraction of 94% or more in the entire steel microstructure at a ½ thickness position in the thickness direction of the base steel (hereinafter, simply referred to as the ½ thickness position). The area fraction of bainite is preferably 97% or more. The area fraction of bainite may be 100%.

Although the steel microstructure of the base steel should be basically composed of bainite as described above, the remainder other than bainite, such as martensite-austenite constituent, ferrite, or cementite, may be contained in a trace amount, which is acceptable as long as a total area fraction of the remainder is 6% or less. Note that the area fraction of the remainder may be 0%.

As mentioned above, bainite is a key microstructure for ensuring both strength and low temperature toughness, and is effectively contributes to increasing the strength of the steel plate through transformation strengthening. However, when the amount of martensite-austenite constituent is increased, in particular, when the area fraction of martensite-austenite constituent at the ½ thickness position exceeds 6%, such martensite-austenite constituent becomes an origin of brittle crack (a fracture origin), making it impossible to obtain the desired low temperature toughness. In this respect, if the area fraction of bainite at the ½ thickness position is adjusted to 94% or more as described above, the area fraction of martensite-austenite constituent at that position is limited to 6% or less. The area fraction of martensite-austenite constituent at the ½ thickness position is preferably 4% or less. For the area fraction of martensite-austenite constituent, the lower limit is not particularly limited, and may be 0%.

Martensite-austenite constituent tends to form near the mid-thickness part of the base steel, and such martensite-austenite constituent has a particularly large impact on the low temperature toughness. Thus, in order to ensure the desired low temperature toughness, it is essential to suppress the area fraction of martensite-austenite constituent at the ½ thickness position.

As used herein, the area fraction of each phase at the ½ thickness position is obtained as follows.

Specifically, it is obtained by mirror polishing an L-cross section (i.e., a cross section parallel to the rolling direction and to the normal direction of the rolled plane) of a base steel at the ½ thickness position in the thickness direction of the base steel, then etching the L-cross section initial or electrolytically etching the L-cross section in the solution of electrolyte: 100 mL distilled water+25 g sodium hydroxide+5 g picric acid, and observing randomly selected regions of $1.2 \times 10^{-2}$ mm$^2$ using a scanning electron microscope (SEM) at ×2000 magnification, and then performing for image interpretation.

Average Crystal Grain Size of Bainite: 25 μm or Less

Since the grain boundaries of bainite resistance brittle crack propagation, refining of crystal grains contributes to improving the low temperature toughness. Therefore, the average crystal grain size of bainite is 25 μm or less. The lower limit is not particularly limited, yet is preferably 5 μm or more.

As used herein, the average crystal grain size of bainite is obtained as follows.

Specifically, it is obtained by mirror polishing an L-section of a base steel at the ½ thickness position in the thickness direction of the base steel (a cross section parallel to the rolling direction and to the normal direction of the rolled plane), then measuring the crystal orientations of randomly selected regions of $1.2 \times 10^{-2}$ mm$^2$ (at ×2000 magnification) using an electron beam backscatter diffraction method (EBSD), and performing image interpretation with those regions where the angular difference between neighboring pixels is 15° or more taken as grain boundaries.

The average crystal grain size $d_{area}$ is calculated by the following equation based on the area $a_i$ of each crystal grain and the equivalent circular diameter $d_i$ of each crystal grain:

$$d_{area} = \Sigma(a_i \cdot d_i)/\Sigma a_i$$

3. Shear Strength at a Bonded Interface Between the Base Steel and the Cladding Metal: 300 MPa or More The clad steel plate is required to prevent separation of the cladding metal from the base steel. Therefore, the bonded interface shear strength between the base steel and the cladding metal is 300 MPa or more. The upper limit is not particularly limited, yet is preferably 400 MPa or less.

The bonded interface shear strength between the base steel and the cladding metal is determined by a shear test in accordance with JIS G 0601.

4. Cladding Metal

In the clad steel plate disclosed herein, the cladding metal is made of a corrosion resistant alloy and bonded to one surface of the base steel.

The corrosion resistant alloy is not particularly limited, and may include, for example, a nickel base alloy and austenitic stainless steel.

In particular, a nickel base alloy is preferred because it exhibits high stress corrosion cracking resistance in an environment under high hydrogen sulfide partial pressure (i.e., a sour environment).

As used herein, for example, the nickel base alloy is preferably Alloy 625 or Alloy 825, and particularly preferably Alloy 625 from the viewpoint of preventing stress corrosion cracking.

Here, Alloy 625 is a nickel base alloy corresponding to NCF625 prescribed in JIS G 4902, and among others, it is preferable to use a nickel base alloy having a chemical composition containing, in mass %, C: 0.030% or less, Si: 0.02% or more and 0.50% or less, Mn: 0.02% or more and 0.50% or less, P: 0.015% or less, S: 0.0010% or less, Cr: 20.0% or more and 23.0% or less, Mo: 8.0% or more and 10.0% or less, Fe: 5.0% or less, Al: 0.02% or more and 0.40% or less, Ti: 0.10% or more and 0.40% or less, and Nb and Ta: 3.15% or more and 4.15% or less in total, with the balance being Ni and inevitable impurities.

In addition, Alloy 825 is a nickel base alloy corresponding to NCF825 prescribed in JIS G 4902, and among others, it is preferable to use a nickel base alloy having a chemical composition containing, in mass %, C: 0.020% or less, Si: 0.50% or less, Mn: 1.00% or less, P: 0.030% or less, S: 0.0050% or less, Ni: 38.0% or more and 46.0% or less, Cr: 19.5% or more and 23.5% or less, Mo: 2.50% or more and 3.50% or less, Cu: 1.50% or more and 3.00% or less, Al: 0.01% or more and 0.20% or less, and Ti: 0.60% or more and 1.20% or less, with the balance being Fe and inevitable impurities.

The following describes preferred chemical compositions for Alloy 625 and Alloy 825 described above. The % representations below indicating the chemical composition are in mass % unless stated otherwise.

(1) Preferred Chemical Composition for Alloy 625
C: 0.030% or Less

C precipitates on grain boundaries as a carbide due to thermal history during the production of a clad steel plate, causing a degradation in corrosion resistance. Thus, a C content beyond 0.030% accelerates precipitation of a carbide and causes a degradation in corrosion resistance. Therefore, the C content is preferably 0.030% or less. It is more preferably 0.020% or less. Note that the lower limit of the C content is not particularly limited, and may be 0%.

Si: 0.02% or More and 0.50% or Less

Si is added for the deoxidizing purpose. When the Si content is less than 0.02%, the addition effect is not sufficient. On the other hand, when the Si content exceeds 0.50%, corrosion resistance deteriorates. Therefore, the Si content is preferably 0.02% or more and 0.50% or less. It is more preferably 0.20% or less.

Mn: 0.02% or More and 0.50% or Less

Mn is added for the deoxidizing purpose. When the Mn content is less than 0.02%, the addition effect is not sufficient. On the other hand, when the Mn content exceeds 0.50%, corrosion resistance deteriorates. Therefore, the Mn content is preferably 0.02% or more and 0.50% or less. It is more preferably 0.15% or less.

P: 0.015% or Less

P is an impurity element that segregates at grain boundaries, causing a degradation in corrosion resistance. Therefore, the P content is preferably 0.015% or less. It is more preferably 0.005% or less. Note that the lower limit of the P content is not particularly limited, and may be 0%.

S: 0.0010% or Less

S, like P, is an impurity element that segregates at grain boundaries, causing a degradation in corrosion resistance. Therefore, the S content is preferably 0.0010% or less. It is more preferably 0.0005% or less. Note that the lower limit of the S content is not particularly limited, and may be 0%.

Cr: 20.0% or More and 23.0% or Less

Cr forms a highly protective oxide coating on the surface of metal and improves pitting corrosion resistance and intergranular corrosion resistance. Cr also improves stress corrosion cracking resistance in a sour environment when added in combination with Ni. However, for the Cr content, it is also necessary to consider the balance with Ni and other alloying elements. From this perspective, the Cr content is preferably 20.0% or more and 23.0% or less. It is more preferably 21.5% or more.

Mo: 8.0% or More and 10.0% or Less

Mo improves pitting corrosion resistance and crevice corrosion resistance. Mo also improves stress corrosion cracking resistance in a sour environment when added in combination with Ni. However, for the Mo content, it is also necessary to consider the balance with Ni and other alloying elements. From this perspective, the Mo content is preferably 8.0% or more and 10.0% or less. It is more preferably 8.5% or more.

Fe: 5.0% or Less

Fe is an impurity that is inevitably contained in the steel composition when ferrochrome, ferromolybdenum, or the like is used as a raw material, and an Fe content beyond 5.0% deteriorates corrosion resistance. Therefore, the Fe content is preferably 5.0% or less. It is more preferably 3.5% or less. Note that the lower limit of the Fe content is not particularly limited, and may be 0%.

Al: 0.02% or More and 0.40% or Less

Although Al is an effective deoxidizing element, the addition effect is not sufficient when the Al content is less than 0.02%. However, an Al content beyond 0.40% deteriorates stress corrosion cracking resistance. Therefore, the Al content is preferably 0.02% or more and 0.40% or less. It is more preferably 0.25% or less.

Ti: 0.10% or More and 0.40% or Less

Ti is effective for immobilizing C. When the Ti content is less than 0.10%, immobilization of C is not sufficient, causing precipitation of a carbide that would deteriorate corrosion resistance. However, a Ti content beyond 0.40% causes precipitation of Ti as an intermetallic compound, lowering the bondability with the base steel. Therefore, the Ti content is preferably 0.10% or more and 0.40% or less. It is more preferably 0.30% or less.

Nb and Ta: 3.15% or More and 4.15% or Less in Total

Nb and Ta are both effective for immobilization of C. When the total content of Nb and Ta is less than 3.15%, the addition effect is not sufficient. On the other hand, when the total content of Nb and Ta exceeds 4.15%, Nb and Ta form an intermetallic compound having a low melting point, lowering the hot workability. Therefore, the total content of Nb and Ta is preferably 3.15% or more and 4.15% or less.

Components other than the above are Ni and inevitable impurities. Note that Ni is an element for improving corrosion resistance, and in particular, significantly improves stress corrosion cracking resistance in a sour environment. Therefore, the Ni content is preferably 58% or more.

(2) Preferred Chemical Composition for Alloy 825

C: 0.020% or Less

C precipitates on grain boundaries as a carbide due to thermal history during the production of a clad steel plate, causing a degradation in corrosion resistance. Thus, a C content beyond 0.020% accelerates precipitation of a carbide and causes a degradation in corrosion resistance. Therefore, the C content is preferably 0.020% or less. It is more preferably 0.015% or less. Note that the lower limit of the C content is not particularly limited, and may be 0%.

Si: 0.50% or Less

Si is added for the deoxidizing purpose. However, when the Si content exceeds 0.50%, Si remains as a non-metallic inclusion, causing a degradation in corrosion resistance. Therefore, the Si content is preferably 0.50% or less. It is more preferably 0.20% or less. Although the lower limit of the Si content is not particularly limited, it is preferably 0.02% or more from the viewpoint of obtaining a sufficient deoxidizing effect.

Mn: 1.00% or Less

Mn is added for the deoxidizing purpose. However, a Mn content beyond 1.00% causes a degradation in corrosion resistance. Therefore, the Mn content is preferably 1.00% or less. It is more preferably 0.50% or less. Although the lower limit of the Mn content is not particularly limited, it is preferably 0.02% or more from the viewpoint of obtaining a sufficient deoxidizing effect.

P: 0.030% or Less

P is an impurity element that segregates at grain boundaries, causing a degradation in corrosion resistance. Therefore, the P content is preferably 0.030% or less. It is more preferably 0.020% or less. Note that the lower limit of the P content is not particularly limited, and may be 0%.

S: 0.0050% or Less

S, like P, is an impurity element that segregates at grain boundaries, causing a degradation in corrosion resistance. Therefore, the S content is preferably 0.0050% or less. It is more preferably 0.0010% or less. Note that the lower limit of the S content is not particularly limited, and may be 0%.

Ni: 38.0% or More and 46.0% or Less

Nickel is an element that improves corrosion resistance, and in particular, that greatly improves stress corrosion cracking resistance in a sour environment. However, since Ni is a very expensive element, adding a large amount of Ni causes an increase in cost. Therefore, the nickel content needs to be set considering the balance between the corrosion resistance improving effect and the cost. From this perspective, the Ni content is preferably 38.0% or more and 46.0% or less.

Cr: 19.5% or More and 23.5% or Less

Cr forms a highly protective oxide coating on the surface of metal and improves pitting corrosion resistance and intergranular corrosion resistance. Cr also improves stress corrosion cracking resistance in a sour environment when added in combination with Ni. However, for the Cr content, it is also necessary to consider the balance with the contents of Ni and other alloying elements. From this perspective, the Cr content is preferably 19.5% or more and 23.5% or less. It is more preferably 21.5% or more.

Mo: 2.50% or More and 3.50% or Less

Mo improves pitting corrosion resistance and crevice corrosion resistance. Mo also improves stress corrosion cracking resistance in a sour environment when added in combination with Ni. However, for the Mo content, it is also necessary to consider the balance with the contents of Ni and other alloying elements. From this perspective, the Mo content is preferably 2.50% or more and 3.50% or less. It is more preferably 3.00% or more.

Cu: 1.50% or More and 3.00% or Less

Cu is an element effective in improving general corrosion resistance. However, when the Cu content is less than 1.50%, the addition effect is not sufficient. On the other hand, when the Cu content exceeds 3.00%, the addition effect is saturated. Therefore, the Cu content is preferably 1.50% or more and 3.00% or less. It is more preferably 1.80% or more.

Al: 0.01% or More and 0.20% or Less

Al is an effective deoxidizing element. However, when the Al content is less than 0.01%, the addition effect is not sufficient. On the other hand, when the Al content exceeds 0.20%, stress corrosion cracking resistance deteriorates. Therefore, the Al content is preferably 0.01% or more and 0.20% or less. It is more preferably 0.10% or more. It is more preferably 0.15% or less.

Ti: 0.60% or More and 1.20% or Less

Ti is effective for immobilizing C. However, when the Ti content is less than 0.60%, immobilization of C is insufficient, causing precipitation of a carbide which would deteriorate corrosion resistance. On the other hand, a Ti content beyond 1.20% causes precipitation of Ti as an intermetallic compound, lowering the bondability with the base steel. Therefore, the Ti content is preferably 0.60% or more and 1.20% or less. It is more preferably 0.70% or more.

Components other than the above are Fe and inevitable impurities.

Although some of the preferred chemical compositions for Alloy 625 and Alloy 825 have been described, corrosion resistant alloys other than the nickel base alloys include austenitic stainless steel.

As used herein, examples of austenitic stainless steel include those prescribed in JIS standards, such as SUS304, SUS316, SUS304L, and SUS316L.

Among these, a preferred austenitic stainless steel has a chemical composition containing, in mass %, C: 0.030% or less, Si: 1.00% or less, Mn: 2.00% or less, P: 0.045% or less, S: 0.030% or less, Ni: 12.00% or more and 15.00% or less, Cr: 16.00% or more and 18.00% or less, and Mo: 2.00% or more and 3.00% or less, with the balance being Fe and inevitable impurities.

The following describes a preferred chemical composition for such austenitic stainless steel. The % representations below indicating the chemical composition are in mass % unless stated otherwise.

(3) Preferred Chemical Composition for Austenitic Stainless Steel

C: 0.030% or Less

C precipitates on grain boundaries as a carbide due to thermal history during the production of a clad steel plate, causing a degradation in corrosion resistance. Thus, a C content beyond 0.030% accelerates precipitation of a carbide and causes a degradation in corrosion resistance. Therefore, the C content is preferably 0.030% or less. It is more preferably 0.020% or less. It is further preferably 0.015% or less. Note that the lower limit of the C content is not particularly limited, and may be 0%.

Si: 1.00% or Less

Si is added for the deoxidizing purpose. However, when the Si content exceeds 1.00%, Si remains as a non-metallic inclusion, causing a degradation in corrosion resistance. Therefore, the Si content is preferably 1.00% or less. It is more preferably 0.75% or less. Note that the lower limit of the Si content is preferably 0.02% or more.

Mn: 2.00% or Less

Mn is added for the deoxidizing purpose. However, a Mn content beyond 2.00% causes a degradation in corrosion resistance. Therefore, the Mn content is preferably 2.00% or less. It is more preferably 1.40% or less. It is further preferably 1.00% or less. The lower limit of the Mn content is preferably 0.02% or more.

P: 0.045% or Less

P is an impurity element that segregates at grain boundaries, causing a degradation in corrosion resistance. Therefore, the P content is preferably 0.045% or less. It is more preferably 0.030% or less. Note that the lower limit of the P content is not particularly limited, and may be 0%.

S: 0.030% or Less

S, like P, is an impurity element that segregates at grain boundaries, causing a degradation in corrosion resistance. Therefore, the S content is preferably 0.030% or less. It is more preferably 0.010% or less. Note that the lower limit of the S content is not particularly limited, and may be 0%.

Ni: 12.00% or More and 15.00% or Less

Nickel is an element that improves corrosion resistance, and in particular, that greatly improves stress corrosion cracking resistance in a sour environment. However, since Ni is a very expensive element, adding a large amount of Ni causes an increase in cost. Therefore, the nickel content needs to be set considering the balance between the corrosion resistance improving effect and the cost. From this perspective, the Ni content is preferably 12.00% or more and 15.00% or less. It is more preferably 12.50% or more. It is more preferably 14.50% or less.

Cr: 16.00% or More and 18.00% or Less

Cr forms a highly protective oxide coating on the surface of metal and improves pitting corrosion resistance and intergranular corrosion resistance. Cr also improves stress corrosion cracking resistance in a sour environment when added in combination with Ni. However, for the Cr content, it is also necessary to consider the balance with Ni and other alloying elements. From this perspective, the Cr content is preferably 16.00% or more and 18.00% or less. It is more preferably 16.50% or more. It is more preferably 17.50% or less.

Mo: 2.00% or More and 3.00% or Less

Mo improves pitting corrosion resistance and crevice corrosion resistance. Mo also improves stress corrosion cracking resistance in a sour environment when added in combination with Ni. However, for the Mo content, it is also necessary to consider the balance with Ni and other alloying elements. From this perspective, the Mo content is preferably 2.00% or more and 3.00% or less. It is more preferably 2.20% or more. It is more preferably 2.80% or less.

Components other than the above are Fe and inevitable impurities.

5. Production Method

Next, methods of producing a clad steel plate according to the present disclosure will be described below.

A method of producing a clad steel plate according to an embodiment of the present disclosure comprises:

preparing a slab by stacking a base steel raw material having the chemical composition of the base steel as recited in 1. and a cladding metal raw material made of a corrosion resistant alloy, and heating the slab to a temperature range of 1050° C. to 1200° C. in surface temperature;

subjecting the slab to first rolling with a rolling reduction ratio at a temperature range of 950° C. or higher in surface temperature being 2.0 or more, followed by second rolling with an accumulated rolling reduction ratio at a temperature range of 900° C. or lower in surface temperature being 50% or more and a finish rolling temperature being at or above $Ar_3$ temperature in surface temperature, to thereby obtain a rolled plate formed of a base steel and a cladding metal;

then subjecting the rolled plate to accelerated cooling with a cooling start temperature being at or above the $Ar_3$ temperature in surface temperature, an average cooling rate being 5° C./s or higher, and a cooling stop temperature being 500° C. or lower at a ½ thickness position in a thickness direction of the base steel; and then subjecting the rolled plate to tempering in a temperature range of 350° C. to 600° C. at the ½ thickness position in the thickness direction of the base steel.

Here, the slab is obtained by stacking the base steel raw material and the cladding metal raw material in the order of, for example, (a) the base steel raw material/the cladding metal raw material, or (b) the base steel raw material/the cladding metal raw material/the cladding metal raw material/the base steel raw material, and then subjecting the base steel raw material(s) and the cladding metal raw material(s) to electron beam welding under a vacuum (negative pressure), specifically under a pressure of $10^{-4}$ torr or lower, so as to be tack welded to each other.

In the case of using a slab of (b), a clad steel plate in which the cladding metal is bonded to one surface of the base steel can be obtained as a product steel plate by applying a separating agent between the layers of "the cladding metal raw material/the cladding metal raw material" in advance, and after completion of the tempering process, separating the top and the bottom of the tempered product.

(1) Slab Heating

Slab Heating Temperature: 1050° C. or Higher and 1200° C. or Lower

When the slab heating temperature is lower than 1050° C., it is difficult to ensure bondability between the base steel and the cladding metal, and some of the components contained in the base steel raw material, such as Nb, may not be sufficiently dissolved, making it difficult to secure proper strength. On the other hand, when the slab heating temperature is higher than 1200° C., austenite crystal grains coarsen in the base steel raw material, causing a degradation in toughness. Therefore, the slab heating temperature is 1050° C. or higher and 1200° C. or lower. It is preferably 1100° C. or lower.

(2) Clad Rolling

First Rolling

Rolling Reduction Ratio in the Temperature Range of 950° C. or Higher: 2.0 or More Bondability between the base steel and the cladding metal of the clad steel plate is ensured by performing rolling in a high temperature range. That is, during rolling in a high temperature range, flow stress of the base steel and the cladding metal is reduced such that a desirable bonded interface is formed, and interdiffusion of elements at the bonded interface is facilitated, with the result that bondability between the base steel and the cladding metal is ensured. Therefore, in first rolling that is performed to ensure the bondability between the base steel and the cladding metal, the rolling reduction ratio in a temperature range of 950° C. or higher in surface temperature (of the slab) needs to be 2.0 or more. It is preferably 2.5 or more. The upper limit is not particularly limited, yet is preferably 5.0 or less from the viewpoint of productivity.

As used herein, the rolling reduction ratio in a temperature range of 950° C. or higher in surface temperature is given by: [the thickness of the slab prior to the first rolling]/[the thickness of the slab after being rolled in the temperature range of 950° C. or higher in surface temperature].

Although the rolling reduction ratio in a temperature range of 950° C. or higher in surface temperature is defined here, the rolling reduction ratio in a temperature range of 1000° C. or higher in surface temperature is preferably set to 2.0 or more, and more preferably to 2.5 or more. Again, the upper limit is not particularly limited, yet is preferably 5.0 or less from the viewpoint of productivity.

However, in the case where a nickel base alloy of Alloy 825 or austenitic stainless steel is used as the cladding metal raw material, the desired bondability between the base steel and the cladding metal is ensured when the rolling reduction ratio in a temperature range of 950° C. or higher in surface temperature is set to 1.5 or more, preferably 1.8 or more. The upper limit is not particularly limited, yet is preferably 5.0 or less from the viewpoint of productivity.

Second Rolling

Accumulated Rolling Reduction Ratio in a Temperature Range of 900° C. or Lower: 50% or More Rolling in a γ non-crystallization temperature range results in an increased grain boundary area due to flattening of crystal grains and introduces deformation bands, thereby increasing nucleation sites during the subsequent accelerated cooling. Consequently, the steel microstructure of the base steel is refined, and the toughness can be secured. From this point of view, rolling in a temperature range of 900° C. or lower in surface temperature (of the slab) is performed as second rolling, and the accumulated rolling reduction ratio in the second rolling is set to 50% or more. Preferably, the second rolling is performed as rolling in a temperature range of 870° C. or lower in surface temperature, and the accumulated rolling reduction ratio in the second rolling is set to 50% or more. The upper limit is not particularly limited, yet is preferably 85% or less from the viewpoint of productivity.

As used herein, the accumulated rolling reduction ratio in the temperature range of 900° C. or lower in surface temperature is given by: [the cumulative rolling reduction amount in the temperature range of 900° C. or lower in surface temperature]/[the thickness of the slab prior to the second rolling]×100.

Finish Rolling Temperature: At or Above $Ar_3$ Temperature in Surface Temperature When the finish rolling temperature is lowered below $Ar_3$ temperature in surface temperature, a microstructure containing ferrite and hard bainite, both of which are elongated in the rolling direction, is formed. This promotes hydrogen-induced cracking and degrades the HIC resistance. Therefore, the finish rolling temperature is set at or above $Ar_3$ temperature in surface temperature of the slab. It is preferably set at or above a temperature of $Ar_3$ temperature+30° C. The upper limit is preferably 900° C. or lower. $Ar_3$ temperature can be determined by:

$$Ar_3(° C.)=910-310[C]-80[Mn]-20[Cu]-55[Ni]-15[Cr]-80[Mo],$$

where [C], [Si], [Mn], [Cu], [Ni], [Cr], and [Mo] respectively indicate the content (in mass %) of C, Si, Mn, Cu, Ni, Cr, and Mo in the base steel. In addition, the content of any of the elements not contained in the base steel has a value of "0" when determining the $Ar_3$ temperature.

(3) Accelerated Cooling (Quenching)
Cooling Start Temperature: At or Above $Ar_3$ Temperature in Surface Temperature If the cooling start temperature is below $Ar_3$ temperature in surface temperature, ferrite is generated prior to bainite transformation in the base steel, making it difficult to ensure the target strength and HIC resistance. Therefore, the cooling start temperature is set at or above $Ar_3$ temperature in surface temperature of the rolled plate. The upper limit is not particularly limited, yet is preferably 900° C. or lower.

Average Cooling Rate: 5° C./s or Higher

If the average cooling rate is lower than 5° C./s, ferrite transformation occurs in the base steel, making it difficult to ensure the target strength and HIC resistance. Therefore, the cooling rate is 5° C./s or higher. It is preferably 10° C./s or higher. The upper limit is not particularly limited, yet is preferably 50° C./s or lower.

As used herein, the average cooling rate is obtained by dividing the difference between the cooling start temperature and the cooling stop temperature at the ½ thickness position in the thickness direction of the base steel of the rolled plate by a cooling time.

Cooling Stop Temperature: 500° C. or Lower

When the cooling stop temperature is above 500° C., a microstructure that would adversely affect the toughness and Charpy absorbed energy, such as coarse cementite or martensite-austenite constituent, is generated in the base steel. Therefore, the cooling stop temperature is 500° C. or lower. It is preferably 300° C. or lower. The lower limit is not particularly limited, yet is preferably 25° C. or higher.

As used herein, the cooling stop temperature is a temperature at the ½ thickness position in the thickness direction of the base steel of the rolled plate.

(4) Tempering
Tempering temperature: 350° C. or higher and 600° C. or lower

After the accelerated cooling, the rolled plate is heated to perform tempering. At this point, when the tempering temperature is below 350° C., martensite-austenite constituent, which adversely affects the toughness and HIC resistance of the base steel, will not be decomposed satisfactorily, and dislocation will not be eliminated or dispersed sufficiently, causing a degradation in the toughness and HIC resistance of the base steel. The same applies when tempering itself is not performed. On the other hand, when the tempering temperature exceeds 600° C., precipitates such as cementite coarsen, causing a degradation in the toughness of the base steel. The formation of precipitates may also deteriorate the corrosion resistance of the cladding metal. Therefore, the tempering temperature is 350° C. or higher and 600° C. or lower. It is preferably 400° C. or higher. It is preferably 500° C. or lower.

As used herein, the tempering temperature is a temperature at the ½ thickness position in the thickness direction of the base steel of the rolled plate.

In addition, the holding time at the tempering temperature is preferably set to 5 min or more and 60 min or less from the perspectives of decomposition of martensite-austenite constituent, elimination or dispersion of dislocation, and formation and coarsening of precipitates.

EXAMPLES

Base steel raw materials with the chemical compositions listed in Table 1 (with the balance being Fe and inevitable impurities) and cladding metal raw materials of nickel base alloy (Alloy 625) with the chemical compositions listed in Table 2-1 (with the balance being Ni and inevitable impurities), cladding metal raw materials of nickel base alloy (Alloy 825) with the chemical compositions listed in Table 2-2 (with the balance being Fe and inevitable impurities), or cladding metal raw materials of austenitic stainless steel with the chemical compositions listed in Table 2-3 (with the balance being Fe and inevitable impurities) were stacked in the order of (a) the base steel raw material/the cladding metal raw material, or (b) the base steel raw material/the cladding metal raw material/the cladding metal raw material/the base steel raw material to obtain a slab. And the slab was subjected to clad rolling (i.e., first rolling and second rolling) under the conditions listed in Table 3, to thereby obtain respective rolled plates. Then, the rolled plated thus obtained were subjected to accelerated cooling and tempering under the conditions listed in Table 3 to produce clad steel plates with a thickness of 30 mm (including a base steel of 27 mm thick and a cladding metal of 3 mm thick).

From the clad steel plates thus obtained, specimens for tensile test and DWTT test were taken, and tensile test and DWTT test (test temperature: –30° C.) were conducted in accordance with API-5L to determine the tensile strength and yield stress, as well as the percent shear area $DWTTSA_{-30° C.}$. The target values for tensile strength and percent shear area $DWTTSA_{-30° C.}$ were as follows:

tensile strength: 535 MPa or more; and percent shear area $DWTTSA_{-30° C.}$: 85% or more ($DWTTSA_{-30° C.}$ of 90% or more was judged particularly good).

In addition, shear test was conducted in accordance with JIS G 0601 to determine the bonded interface shear strength between the base steel and the cladding metal, and the bondability between the base steel and the cladding metal was evaluated. Note that the bondability was judged good when the bonded interface shear strength was 300 MPa or more.

In addition, HIC test was conducted in accordance with NACE Standard TM0284-2003 to evaluate the HIC resistance of the base steel based on the crack area ratio (CAR). The target values for crack area ratio (CAR) were as follows:

crack area ratio (CAR): 5.0% or less (a crack area ratio (CAR) of 1.0% or less was judged particularly good).

Note that the crack area ratio (CAR) was measured by immersing 3 specimens taken from each steel plate in an aqueous solution of 5 mass % NaCl+0.5 mass % CH₃COOH saturated with hydrogen sulfide for 96 hours, and then detecting any defects by ultrasonic testing for the specimens. The above evaluations were based on the maximum of crack area ratios (CARs) measured on three specimens.

In addition, identification of steel microstructures, calculation of area fractions for each phase, and calculation of the average crystal grain size of bainite were carried out by the method set forth above.

The results are listed in Table 4.

TABLE 1

| Base steel No. | Chemical composition of base steel (mass %) | | | | | | | | | |
|---|---|---|---|---|---|---|---|---|---|---|
|  | C | Si | Mn | P | S | Al | Nb | Ti | N | Cu |
| A1 | 0.019 | 0.12 | 0.60 | 0.007 | 0.0006 | 0.03 | 0.052 | 0.002 | 0.0042 | 0.21 |
| A2 | 0.028 | 0.41 | 1.60 | 0.003 | 0.0004 | 0.05 | 0.071 | 0.014 | 0.0051 | 0.26 |
| A3 | 0.040 | 0.31 | 1.30 | 0.003 | 0.0004 | 0.03 | 0.029 | 0.010 | 0.0044 | 0.05 |
| A4 | 0.056 | 0.21 | 1.37 | 0.003 | 0.0006 | 0.04 | 0.062 | 0.015 | 0.0056 | 0.43 |
| A5 | 0.060 | 0.14 | 1.20 | 0.003 | 0.0005 | 0.04 | 0.038 | 0.016 | 0.0055 | 0.46 |
| A6 | 0.041 | 0.16 | 1.50 | 0.003 | 0.0006 | 0.03 | 0.051 | 0.014 | 0.0053 | 0.03 |
| A7 | 0.042 | 0.15 | 1.10 | 0.003 | 0.0006 | 0.03 | 0.052 | 0.010 | 0.0045 | 0.04 |
| A8 | 0.108 | 0.16 | 1.90 | 0.007 | 0.0004 | 0.04 | 0.050 | 0.016 | 0.0049 | 0.26 |
| A9 | 0.039 | 0.55 | 1.60 | 0.007 | 0.0004 | 0.03 | 0.091 | 0.035 | 0.0050 | 0.28 |
| A10 | 0.042 | 0.15 | 1.60 | 0.006 | 0.0006 | 0.03 | 0.003 | 0.014 | 0.0055 | 0.27 |
| A11 | 0.085 | 0.30 | 0.80 | 0.002 | 0.0004 | 0.03 | 0.051 | 0.010 | 0.0044 | 0.05 |
| A12 | 0.039 | 0.29 | 1.30 | 0.003 | 0.0004 | 0.03 | 0.030 | 0.011 | 0.0045 | 0.05 |
| A13 | 0.028 | 0.30 | 1.30 | 0.003 | 0.0004 | 0.03 | 0.052 | 0.010 | 0.0045 | 0.05 |

| Base steel No. | Chemical composition of base steel (mass %) | | | | | | ACR | $P_{HIC}$ | $Ar_3$ (° C.) | Remarks |
|---|---|---|---|---|---|---|---|---|---|---|
|  | Ni | Cr | Mo | V | Ca | O |  |  |  |  |
| A1 | 0.27 | 0.08 | 0.090 | 0.050 | 0.0013 | 0.0010 | 1.27 | 0.605 | 829 | Comparative steel |
| A2 | 0.24 | 0.03 | 0.100 | 0.002* | 0.0015 | 0.0013 | 2.03 | 0.928 | 746 | Comparative steel |
| A3 | 0.04 | 0.28 | 0.280 | 0.001* | 0.0018 | 0.0013 | 2.52 | 0.945 | 764 | Comparative steel |
| A4 | 0.44 | 0.02 | 0.050 | 0.030 | 0.0014 | 0.0011 | 1.34 | 0.992 | 746 | Comparative steel |
| A5 | 0.45 | 0.05 | 0.100 | 0.002* | 0.0013 | 0.0012 | 1.41 | 0.965 | 753 | Comparative steel |
| A6 | 0.05 | 0.21 | 0.140 | 0.002* | 0.0013 | 0.0012 | 1.17 | 0.956 | 760 | Comparative steel |
| A7 | 0.03 | 0.39 | 0.380 | 0.002* | 0.0015 | 0.0013 | 1.35 | 0.938 | 770 | Comparative steel |
| A8 | 0.21 | 0.03 | 0.140 | 0.090 | 0.0025 | 0.0012 | 3.79 | 1.536 | 696 | Comparative steel |
| A9 | 0.23 | 0.02 | 0.140 | 0.002* | 0.0003 | 0.0012 | 0.07 | 1.081 | 740 | Comparative steel |
| A10 | 0.24 | 0.02 | 0.140 | 0.002* | 0.0060 | 0.0011 | 6.59 | 1.072 | 739 | Comparative steel |
| A11 | 0.44 | 0.10 | 0.450 | 0.001* | 0.0018 | 0.0013 | 2.52 | 0.995 | 757 | Comparative steel |
| A12 | 0.06 | 0.28 | 0.280 | 0.001* | 0.0035 | 0.0013 | 5.35 | 0.943 | 763 | Comparative steel |
| A13 | 0.06 | 0.28 | 0.280 | 0.001* | 0.0020 | 0.0013 | 2.86 | 0.894 | 766 | Comparative steel |

*Contained as an inevitable impurity.

TABLE 2-1

| Cladding metal No. | Chemical composition of cladding metal (mass %) | | | | | | | | | | |
|---|---|---|---|---|---|---|---|---|---|---|---|
|  | C | Si | Mn | P | S | Cr | Mo | Fe | Al | Ti | Nb + Ta |
| B1a | 0.014 | 0.16 | 0.13 | 0.003 | 0.0008 | 22.1 | 9.2 | 2.9 | 0.20 | 0.22 | 4.09 |
| B2a | 0.009 | 0.16 | 0.14 | 0.004 | 0.0007 | 21.6 | 8.9 | 3.3 | 0.18 | 0.22 | 4.15 |
| B3a | 0.018 | 0.18 | 0.15 | 0.003 | 0.0009 | 22.3 | 8.4 | 3.2 | 0.16 | 0.25 | 3.89 |

TABLE 2-2

| Cladding metal No. | Chemical composition of cladding metal (mass %) | | | | | | | | | | |
|---|---|---|---|---|---|---|---|---|---|---|---|
|  | C | Si | Mn | P | S | Ni | Cr | Mo | Cu | Al | Ti |
| B1 | 0.010 | 0.23 | 0.41 | 0.019 | 0.0003 | 39.5 | 23.4 | 3.14 | 2.17 | 0.13 | 0.73 |
| B2 | 0.014 | 0.25 | 0.39 | 0.018 | 0.0004 | 41.5 | 22.1 | 3.41 | 1.89 | 0.18 | 1.11 |
| B3 | 0.018 | 0.26 | 0.41 | 0.018 | 0.0006 | 44.2 | 20.3 | 2.61 | 2.81 | 0.16 | 0.80 |

TABLE 2-3

| Cladding metal No. | Chemical composition of cladding metal (mass %) | | | | | | | |
|---|---|---|---|---|---|---|---|---|
| | C | Si | Mn | P | S | Ni | Cr | Mo |
| B4 | 0.015 | 0.61 | 0.76 | 0.021 | 0.0006 | 12.21 | 17.68 | 2.15 |
| B5 | 0.019 | 0.51 | 0.55 | 0.021 | 0.0007 | 13.45 | 17.85 | 2.89 |
| B6 | 0.015 | 0.56 | 0.64 | 0.018 | 0.0005 | 14.41 | 16.31 | 2.55 |

TABLE 3

| | | Clad rolling | | | | | | | |
|---|---|---|---|---|---|---|---|---|---|
| | | First rolling | Second rolling | | | | | | |
| | Slab heating | Rolling reduction | Rolling reduction ratio at | Finish rolling | Accelerated cooling | | | Tempering | |
| Production conditions No. | Slab heating temperature (° C.) | ratio at or above 950° C. | or below 900° C. (%) | temperature (° C.) | Cooling start temperature (° C.) | Cooling rate (° C.) | Cooling stop temperature (° C.) | Tempering temperature (° C.) | Tempering Time (min) |
| C1 | 1150 | 2.0 | 50 | 820 | 800 | 10 | 200 | 500 | 10 |
| C2 | 1050 | 2.0 | 60 | 820 | 800 | 11 | 200 | 500 | 10 |
| C3 | 1150 | 2.5 | 50 | 840 | 820 | 11 | 200 | 500 | 10 |
| C4 | 1150 | 2.0 | 50 | 820 | 800 | 10 | 450 | 500 | 10 |
| C5 | 1150 | 2.0 | 50 | 820 | 800 | 10 | 200 | 550 | 10 |
| C6 | 1150 | 2.0 | 50 | 820 | 800 | 10 | 200 | 400 | 40 |
| C7 | 1300 | 2.0 | 50 | 840 | 820 | 10 | 200 | 500 | 10 |
| C8 | 1000 | 2.0 | 50 | 840 | 820 | 10 | 200 | 500 | 10 |
| C9 | 1100 | 2.0 | 40 | 840 | 820 | 10 | 200 | 500 | 10 |
| C10 | 1100 | 2.0 | 50 | 840 | 820 | 1 | 200 | 500 | 10 |
| C11 | 1100 | 2.0 | 50 | 840 | 820 | 10 | 550 | 300 | 10 |
| C12 | 1100 | 2.0 | 50 | 840 | 820 | 10 | 200 | 650 | 10 |
| C13 | 1100 | 1.8 | 50 | 840 | 820 | 10 | 200 | 500 | 10 |
| C14 | 1100 | 2.0 | 50 | 760 | 740 | 10 | 200 | 500 | 10 |
| C15 | 1150 | 2.0 | 50 | 820 | 800 | 10 | 550 | — | — |

TABLE 4

| No. | Base steel No. | Cladding metal No. | Production conditions No. | Steel microstructure of base steel | | | | | Evaluation results | | | | | Remarks |
|---|---|---|---|---|---|---|---|---|---|---|---|---|---|---|
| | | | | Area fraction of bainite at 1/2 thickness position (%) | Area fraction of remainder (%) | Remainder* | Average grain size of bainite (μm) | Area fraction of martensite-austenite constituent at 1/2 thickness position (%) | YS (MPa) | TS (MPa) | DWTT SA$_{-30° C.}$ (%) | Shear strength at bonded interface (MPa) | Maximum value of CAR (%) | |
| 1 | A1 | B1 | C1 | 10 | 90 | M, F, θ | 25 | 1 | 410 | 492 | 100 | 331 | 20.0 | Comparative Example |
| 2 | A2 | B1 | C1 | 97 | 3 | M, θ | 21 | 3 | 505 | 601 | 95 | 315 | 3.2 | Example |
| 3 | A3 | B1 | C1 | 96 | 4 | M, θ | 23 | 3 | 469 | 573 | 90 | 328 | 1.2 | Example |
| 4 | A4 | B1 | C1 | 97 | 3 | M, θ | 18 | 2 | 484 | 582 | 100 | 321 | 1.6 | Example |
| 5 | A5 | B1 | C1 | 96 | 4 | M, θ | 20 | 2 | 458 | 559 | 98 | 319 | 1.3 | Example |
| 6 | A6 | B1 | C1 | 96 | 4 | M, θ | 20 | 3 | 478 | 575 | 98 | 331 | 2.2 | Example |
| 7 | A7 | B1 | C1 | 96 | 4 | M, θ | 21 | 3 | 502 | 590 | 98 | 340 | 1.1 | Example |
| 8 | A8 | B1 | C1 | 92 | 8 | M, θ | 19 | 7 | 536 | 638 | 65 | 328 | 29.2 | Comparative Example |
| 9 | A9 | B1 | C1 | 94 | 6 | M, θ | 18 | 5 | 502 | 598 | 45 | 318 | 25.3 | Comparative Example |
| 10 | A10 | B1 | C1 | 97 | 3 | M, θ | 35 | 2 | 473 | 560 | 20 | 322 | 10.1 | Comparative Example |
| 11 | A3 | B1 | C2 | 97 | 3 | M, θ | 20 | 2 | 480 | 587 | 100 | 303 | 1.2 | Example |
| 12 | A3 | B1 | C3 | 97 | 3 | M, θ | 23 | 2 | 483 | 582 | 88 | 356 | 1.3 | Example |
| 13 | A3 | B1 | C4 | 94 | 6 | M, θ | 23 | 5 | 474 | 592 | 85 | 321 | 1.4 | Example |
| 14 | A3 | B1 | C5 | 98 | 2 | M, θ | 23 | 1 | 484 | 577 | 90 | 316 | 2.1 | Example |
| 15 | A3 | B1 | C6 | 95 | 5 | M, θ | 23 | 4 | 474 | 587 | 98 | 320 | 1.3 | Example |
| 16 | A3 | B1 | C7 | 97 | 3 | M, θ | 35 | 2 | 484 | 582 | 20 | 353 | 1.2 | Comparative Example |

TABLE 4-continued

| | | | | Steel microstructure of base steel | | | | Evaluation results | | | | | |
|---|---|---|---|---|---|---|---|---|---|---|---|---|---|
| No. | Base steel No. | Cladding metal No. | Production conditions No. | Area fraction of bainite at 1/2 thickness position (%) | Area fraction of remainder (%) | Remainder* | Average grain size of bainite (μm) | Area fraction of martensite-austenite constituent at 1/2 thickness position (%) | YS (MPa) | TS (MPa) | DWTT SA$_{-30°C}$ (%) | Shear strength at bonded interface (MPa) | Maximum value of CAR (%) | Remarks |
| 17 | A3 | B1 | C8 | 98 | 2 | M, θ | 19 | 1 | 465 | 564 | 100 | 236 | 1.5 | Comparative Example |
| 18 | A3 | B1 | C9 | 97 | 3 | M, θ | 28 | 2 | 482 | 581 | 65 | 331 | 1.3 | Comparative Example |
| 19 | A3 | B1 | C10 | 10 | 90 | M, F, θ | 20 | 1 | 424 | 517 | 100 | 328 | 19.8 | Comparative Example |
| 20 | A3 | B1 | C11 | 91 | 9 | M, θ | 23 | 7 | 470 | 595 | 80 | 333 | 5.1 | Comparative Example |
| 21 | A3 | B1 | C12 | 93 | 7 | M, θ | 23 | 1 | 489 | 572 | 65 | 342 | 1.5 | Comparative Example |
| 22 | A3 | B1 | C13 | 97 | 3 | M, θ | 23 | 2 | 484 | 582 | 88 | 302 | 1.3 | Example |
| 23 | A3 | B1 | C14 | 22 | 78 | M, F, θ | 20 | 2 | 505 | 590 | 100 | 310 | 15.6 | Comparative Example |
| 24 | A3 | B2 | C1 | 97 | 3 | M, θ | 23 | 2 | 484 | 582 | 88 | 322 | 1.2 | Example |
| 25 | A3 | B3 | C1 | 97 | 3 | M, θ | 23 | 2 | 486 | 583 | 90 | 320 | 1.5 | Example |
| 26 | A3 | B4 | C1 | 97 | 3 | M, θ | 23 | 2 | 485 | 583 | 90 | 335 | 1.2 | Example |
| 27 | A3 | B5 | C1 | 97 | 3 | M, θ | 23 | 2 | 484 | 583 | 88 | 332 | 1.2 | Example |
| 28 | A3 | B6 | C1 | 97 | 3 | M, θ | 23 | 2 | 485 | 582 | 90 | 330 | 1.3 | Example |
| 29 | A3 | B4 | C13 | 97 | 3 | M, θ | 23 | 2 | 483 | 580 | 88 | 305 | 1.3 | Example |
| 30 | A11 | B1 | C1 | 94 | 6 | M, θ | 19 | 2 | 469 | 573 | 98 | 322 | 2.0 | Example |
| 31 | A12 | B1 | C1 | 96 | 4 | M, θ | 23 | 3 | 472 | 575 | 88 | 320 | 4.0 | Example |
| 32 | A13 | B1 | C1 | 97 | 3 | M, θ | 19 | 1 | 484 | 582 | 100 | 330 | 0.0 | Example |
| 33 | A3 | B1a | C1 | 97 | 3 | M, θ | 23 | 2 | 486 | 582 | 88 | 300 | 1.5 | Example |
| 34 | A3 | B2a | C1 | 97 | 3 | M, θ | 23 | 2 | 484 | 583 | 88 | 302 | 1.4 | Example |
| 35 | A3 | B3a | C1 | 97 | 3 | M, θ | 23 | 2 | 485 | 582 | 88 | 305 | 1.5 | Example |
| 36 | A4 | B1 | C15 | 90 | 10 | M, θ | 19 | 9 | 474 | 592 | 65 | 330 | 5.5 | Comparative Example |

*M: martensite-austenite constituent, F: ferrite phase, θ: cementite

It can be seen from Table 4 that all of our examples yielded a tensile strength as high as 535 MPa or more and a percent shear area DWTTSA$_{-30°C}$ of 85% or more, as well as good bondability and HIC resistance.

In contrast, for Comparative Example No. 1 in Table 4, the C, Mn, and Ti contents of the base steel were below the appropriate range and the finish rolling temperature and the cooling start temperature were lower than Ara temperature, with the result that a large amount of ferrite was generated during cooling, and the desired tensile strength and HIC resistance could not be obtained. For Comparative Example No. 8, the C and Mn contents of the base steel were beyond the appropriate range, the amount of martensite-austenite constituent generated was increased, and the desired low temperature toughness could not be obtained. Also, since P$_{HIC}$ is beyond the appropriate range, the hardness of the center segregation increases, making it impossible to obtain the desired HIC resistance.

For Comparative Example No. 9, the Si content of the base steel is beyond the appropriate range. In addition, since the Nb and Ti contents are beyond the appropriate range, TiN coarsen, which provides an origin of a brittle crack (a fracture origin), making it impossible to obtain the desired low temperature toughness. In addition, because not only are the Ca content and ACR below the appropriate ranges, but also P$_{HIC}$ is beyond the appropriate range, the hardness of the center segregation increases along with the generation of MnS, making it impossible to obtain and the desired HIC resistance.

For Comparative Example No. 10, the Nb content is below the appropriate range, the expansion of the γ non-crystallization temperature range is not sufficient, austenite coarsens, and fine crystal grains of bainite cannot be obtained in the product plate, making it impossible to obtain the desired low temperature toughness. In addition, the Ca content and ACR are beyond the appropriate ranges, more Ca-based oxides are formed, and the desired HIC resistance cannot be obtained.

For Comparative Example No. 16, the slab heating temperature is higher than the appropriate range, austenite coarsens, and fine crystal grains of bainite cannot be obtained in the product plate, making it impossible to obtain the desired low temperature toughness.

For Comparative Example No. 17, the slab heating temperature is lower than the appropriate range, and then the desired bondability between the base steel and the cladding metal cannot be obtained.

For Comparative Example No. 18, the accumulated rolling reduction ratio in the temperature range of 900° C. or lower in surface temperature is below the appropriate range, and then refining of bainite is not sufficient, making it impossible to obtain the desired low temperature toughness.

For Comparative Example No. 19, the average cooling rate is below the appropriate range, and then a large amount of ferrite is generated during cooling, making it impossible to obtain the desired tensile strength and HIC resistance.

For Comparative Example No. 20, the cooling stop temperature is higher than the appropriate range and the tempering temperature is also lower than the appropriate range, and then a large amount of martensite-austenite constituent is generated, making it impossible to obtain the desired low temperature toughness and HIC resistance.

For Comparative Example No. 21, the tempering temperature is higher than the appropriate range, and then precipitates (cementite) coarsen, making it impossible to obtain the desired low temperature toughness.

For Comparative Example No. 23, the finish rolling temperature and cooling start temperature are lower than Ara temperature, and then a microstructure containing ferrite and hard bainite elongated in the rolling direction is formed, making it impossible to obtain the desired HIC resistance.

For Comparative Example No. 36, the cooling stop temperature is higher than the appropriate range and tempering is not performed, and then a large amount of martensite-austenite constituent is formed, making it impossible to obtain the desired low temperature toughness and HIC resistance.

The invention claimed is:

1. A clad steel plate comprising:
a base steel; and
a cladding metal made of a corrosion resistant alloy bonded to one surface of the base steel;
wherein the base steel has a chemical composition containing, in mass %,
C: 0.020% or more and 0.100% or less,
Si: 0.05% or more and 0.50% or less,
Mn: 0.75% or more and 1.60% or less,
P: 0.010% or less,
S: 0.0010% or less,
Al: 0.010% or more and 0.070% or less,
Nb: 0.005% or more and 0.080% or less,
Ti: 0.005% or more and 0.030% or less,
N: 0.0010% or more and 0.0060% or less,
Ca: 0.0005% or more and 0.0040% or less,
O: 0.0030% or less, and
at least one selected from the group consisting of
Cu: 0.01% or more and 0.50% or less,
Cr: 0.01% or more and 0.50% or less,
Mo: 0.01% or more and 0.50% or less,
V: 0.010% or more and 0.100% or less, and
Ni: 0.01% or more and 0.50% or less,
so as to satisfy relations given by the following formulas (1) and (2), with the balance being Fe and inevitable impurities:

$$1.00 \leq ACR \leq 6.00 \quad (1),$$

where ACR is defined by:

$$ACR=([Ca]-(0.18+130[Ca])\times[O])/(1.25[S]),$$

where [Ca], [O], and [S] respectively represent the contents in mass % of Ca, O, and S in the base steel, and $$P_{HIC}<1.000 \quad (2),$$

where $P_{HIC}$ is defined by:

$$P_{HIC}=4.46[C]+2.37[Mn]/6+(1.18[Cr]+1.95[Mo]+1.74[V])/5+(1.74[Cu]+1.7[Ni])/15+22.36[P],$$

where [C], [Mn], [Cr], [Mo], [V], [Cu], [Ni], and [P] respectively represent the contents in mass % of C, Mn, Cr, Mo, V, Cu, Ni, and P in the base steel,
wherein the base steel has a steel microstructure in which bainite is present in an area fraction of 94% or more at a ½ thickness position in a thickness direction of the base steel, and with an average crystal grain size of 25 μm or less,
wherein shear strength at a bonded interface between the base steel and the cladding metal is 300 MPa or more, and
wherein a crack area ratio obtained by HIC test in accordance with NACE Standard TM0284-2003 is 5.0% or less.

2. The clad steel plate according to claim 1, wherein the corrosion resistant alloy is a nickel base alloy or austenitic stainless steel.

3. A method of producing the clad steel plate of claim 1, the method comprising:
preparing a slab by stacking a base steel raw material having the chemical composition of the base steel as recited in claim 1 and a cladding metal raw material made of a corrosion resistant alloy, and heating the slab to a temperature range of 1050° C. to 1200° C. in surface temperature;
subjecting the slab to first rolling with a rolling reduction ratio at a temperature range of 950° C. or higher in surface temperature being 2.0 or more, followed by second rolling with an accumulated rolling reduction ratio at a temperature range of 900° C. or lower in surface temperature being 50% or more and a finish rolling temperature being at or above $Ar_3$ temperature in surface temperature, to thereby obtain a rolled plate formed of a base steel and a cladding metal;
then subjecting the rolled plate to accelerated cooling with a cooling start temperature being at or above the $Ar_3$ temperature in surface temperature, an average cooling rate being 5° C./s or higher, and a cooling stop temperature being 500° C. or lower at a ½ thickness position in a thickness direction of the base steel; and
then subjecting the rolled plate to tempering in a temperature range of 350° C. to 600° C. at the ½ thickness position in the thickness direction of the base steel,
wherein in the accelerated cooling, the average cooling rate is obtained by dividing the difference between the cooling start temperature and the cooling stop temperature at the ½ thickness position in the thickness direction of the base steel by a cooling time.

4. A method of producing the clad steel plate of claim 1, the method comprising:
preparing a slab by stacking a base steel raw material having the chemical composition of the base steel as recited in claim 1 and a cladding metal raw material made of either austenitic stainless steel or a nickel base alloy of Alloy 825, and then heating the slab to a temperature range of 1050° C. to 1200° C. in surface temperature;
subjecting the slab to first rolling with a rolling reduction ratio being 1.5 or more in a temperature range of 950° C. or higher in surface temperature, followed by second rolling with an accumulated rolling reduction ratio being 50% or more in a temperature range of 900° C. or lower in surface temperature and a finish rolling temperature being at or above $Ar_3$ temperature in surface temperature, to thereby obtain a rolled plate formed of a base steel and a cladding metal;
then subjecting the rolled plate to accelerated cooling with a cooling start temperature being at or above the $Ar_3$ temperature in surface temperature, an average cooling rate being 5° C./s or higher, and a cooling stop temperature being 500° C. or lower at a ½ thickness position in a thickness direction of the base steel; and
then subjecting the rolled plate to tempering in a temperature range of 350° C. to 600° C. at the ½ thickness position in the thickness direction of the base steel, wherein in the accelerated cooling, the average cooling rate is obtained by dividing the difference between the cooling start temperature and the cooling stop temperature at the ½ thickness position in the thickness direction of the base steel by a cooling time.

5. The method according to claim 3, wherein the slab is prepared by stacking the base steel raw material and the cladding metal raw material in the following order: the base steel raw material/the cladding metal raw material/the cladding metal raw material/the base steel raw material.

6. The method according to claim 4, wherein the slab is prepared by stacking the base steel raw material and the cladding metal raw material in the following order: the base steel raw material/the cladding metal raw material/the cladding metal raw material/the base steel raw material.

* * * * *